(12) United States Patent
Janosky et al.

(10) Patent No.: US 8,089,406 B2
(45) Date of Patent: Jan. 3, 2012

(54) LOCATIONING OF COMMUNICATION DEVICES

(75) Inventors: Milton Janosky, Hollis, NH (US); Tyler Robinson, Merrimack, NH (US); John J. Kelly, Groton, MA (US); Peter Dusaitis, Manchester, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 202 days.

(21) Appl. No.: 12/487,544

(22) Filed: Jun. 18, 2009

(65) Prior Publication Data
US 2010/0321241 A1    Dec. 23, 2010

(51) Int. Cl.
*G01S 3/02* (2006.01)
(52) U.S. Cl. .................................. 342/450
(58) Field of Classification Search .......... 342/450
See application file for complete search history.

(56) References Cited

U.S. PATENT DOCUMENTS

| | | | |
|---|---|---|---|
| 3,781,879 A * | 12/1973 | Staras et al. | 342/159 |
| 4,594,595 A | 6/1986 | Struckman | |
| 6,670,920 B1 | 12/2003 | Herrick | |
| 7,126,533 B2 | 10/2006 | Fiore et al. | |
| 7,233,285 B2 | 6/2007 | Struckman | |
| 7,268,728 B1 * | 9/2007 | Struckman | 342/424 |
| 7,292,198 B2 | 11/2007 | Shtrom et al. | |
| 7,358,891 B2 | 4/2008 | Struckman et al. | |
| 7,358,912 B1 | 4/2008 | Kish et al. | |
| 7,362,280 B2 | 4/2008 | Shtrom et al. | |
| 7,436,351 B2 | 10/2008 | Struckman et al. | |
| 7,453,400 B2 | 11/2008 | Struckman et al. | |
| 2006/0098616 A1 | 5/2006 | Kish et al. | |
| 2006/0109067 A1 | 5/2006 | Shtrom | |
| 2006/0192720 A1 | 8/2006 | Shtrom | |
| 2007/0026807 A1 | 2/2007 | Kish | |
| 2007/0197229 A1 | 8/2007 | Kalliola et al. | |
| 2007/0252666 A1 | 11/2007 | Shtrom | |
| 2008/0129640 A1 | 6/2008 | Shtrom et al. | |
| 2009/0047925 A1 * | 2/2009 | Rahman | 455/404.2 |

OTHER PUBLICATIONS

"Crescent Vector OEM Board", Hemisphere GPS (2 pages).
"First Responder Interoperable Communications System", BAE Systems Electronics & Integration Solutions (5 pages).
"First Intercomm The First InterComm Solution", BAE Systems (1 page).
"Kismet (software)", Wikipedia, the free encyclopedia (2 pages).
"Kismet", Latest Kismet stable release, (24 pages).

(Continued)

*Primary Examiner* — Harry Liu
(74) *Attorney, Agent, or Firm* — Finch & Maloney, PLLC; Neil F. Maloney

(57) ABSTRACT

Techniques are disclosed for detecting, identifying, and/or geolocating RF communications devices, such as FRS radios, high-power cordless phones, cellular phones, and other wireless communications receiver devices. The techniques exploit a vulnerability present in such devices, and can be used to detect (e.g., up to 300 meters) and geolocate (e.g., within +/−3 meters) those devices. The vulnerability is that receiver circuitry of the target devices emanate RF mixing products when flooded with RF energy or suitable stimulus signal. Such a response to a stimulus signal is unexpected or otherwise unintentional, as receiver circuitry is generally not designed to transmit information. The RF frequency, phase, and amplitude of these sideband RF responses can be used to detect and location the devices. The techniques work in the presence of interference, and can be used on devices that are powered on or off.

20 Claims, 14 Drawing Sheets

OTHER PUBLICATIONS

Hippenstiel et al., Localization of Wireless Emitters Based on the Time Difference of Arrival (TDOA) and Wavelet Denoising (67 pages).
"MediaFlex FAQs", Ruckus Wireless (3 pages).
"The Ultimate Wireless Multimedia Solution for Service Provider", Ruckus Wireless (1 page).
"NetStumbler", Wikipedia, the free encyclopedia (1 page).
"Model 2+", OQO Products (1 page).
"RR7855 Radio Direction Finding System", Raven Research (8 pages).
"VAIO US Series Micro PC", Sony (2 pages).
"Yellowjacket-B 702.11b Wi-Fi Analysis System", Berkeley Varitronics Systems (2 pages).
Model 5126 Linear Power RF Amplifier:, OPHIR RF, (1 page).

* cited by examiner

LOCATIONING OF COMMUNICATION DEVICES

RELATED APPLICATIONS

This application is related to U.S. application Ser. No. 12/487,469, filed Jun. 18, 2009, and titled "Direction Finding of Wireless Devices." This application is also related to U.S. application Ser. No. 12/487,511, filed Jun. 18, 2009, and titled "Direction Finding and Geolocation of Wireless Devices." Each of these applications is herein incorporated by reference in its entirety.

FIELD OF THE INVENTION

The invention relates to wireless communications, and more particularly, to techniques for detecting and locationing wireless communication devices such as receivers, transceivers, and other such detectable electronic devices.

BACKGROUND OF THE INVENTION

Conventional techniques for locating wireless emitters (e.g., access points and laptops) are typically based on measuring the amplitude of the emitter with a portable receiver, and moving around to find the direction in which the amplitude increases. The general assumption is that the stronger the signal amplitude, the closer the emitter is believed to be. Several commercial devices were developed for this purpose (e.g., Yellowjacket® 802.11b Wi-Fi Analysis System).

There are a number of problems associated with such amplitude-based techniques for locating wireless emitters. For instance, the techniques tend to be highly inaccurate due to the incidence of RF multipath created by the RF waveforms emanating from the wireless emitters. These waveforms bounce off conductive objects or surfaces in the environment, which causes multiple false readings on increased amplitude (false directions) that then disappear as the user leaves the multipath. Thus, conventional amplitude-based locationing techniques will create many false high amplitude paths to the target that will be incorrect, and will not work in a high multipath environment, such as a neighborhood (e.g., street scene) or building (e.g., home, office building, or cafe). Moreover, emitter devices that are not currently powered-on are not detectable. In addition, some electronic devices, such as passive receivers that are not designed to intentionally emit energy, are not detectable using conventional locationing techniques.

There is a need, therefore, for techniques that allow for the detection, identification, and geolocation of wireless emitters. In a more general sense, there is a need for locationing of communication receiver devices.

SUMMARY OF THE INVENTION

One embodiment of the present invention provides a method for locating a wireless communications receiver device. The method includes transmitting a stimulus signal to an area of interest to stimulate wireless communications receiver devices within that area. The method continues with receiving a response signal from a wireless communications receiver device, wherein the stimulus signal causes multiple RF mixing products to be emanated from the wireless communications receiver device. This response is unexpected or otherwise unintentional, as receiver circuitry is generally not designed to transmit information. The method further includes performing locationing of the wireless communications receiver device, based on the response signal. Performing locationing may include, for example, performing direction finding to the wireless communications receiver device (based on the response signal), and/or performing geolocation of the wireless communications receiver device (based on direction finding results and/or the response data). In one such case, performing direction finding may include measuring one or more response signal parameters for each of Y antenna patterns thereby providing a Y sample array of response data from the wireless communications receiver device, wherein Y is greater than 1, and correlating the sample array to a plurality of entries in a database of calibrated arrays having known azimuths to determine a line of bearing (LOB) to the wireless communications receiver device. Here, the method may further include repeating the transmitting, measuring and correlating to determine one or more additional LOBs to the wireless communications receiver device (each LOB computed from a different geographic location), and geolocating the wireless communications receiver device based on the LOBs. The correlating step may include, for example, generating a correlation plot having a peak using correlation factors resulting from correlation of the sample array to the plurality of entries in the database, identifying a target azimuth of the sample array based on the peak of the correlation plot, and determining the LOB to the wireless communications receiver device based on the target azimuth. Each of the LOBs can be associated with position and heading tags provided by a global positioning satellite (GPS) module to assist in geolocating the wireless communications receiver device. The method may include graphically displaying an LOB and/or a geolocation to the wireless communications receiver device. In one example case, the stimulus signal has a minimum power level of 0.5 Volts/meter. In another example case, the stimulus signal has a frequency that is outside known interference bands. The one or more response signal parameters may include, for example, response signal amplitude. The method can be carried out, for example, using a vehicle-based system. In another particular case, the stimulus signal has a frequency F1 and the wireless communications receiver device is powered-off. Here, the method may include transmitting a second stimulus signal having a frequency F2 (simultaneously with F1) to the area of interest to stimulate wireless communications receiver devices within that area. In one such case, the response signals include at least one of 2F1–F2, 2F2–F1, 2F1, F1+F2, and/or 2F2.

Another embodiment of the present invention provides a system for locationing a wireless communications receiver device. The system includes a transmitter for transmitting a stimulus signal to an area of interest to stimulate wireless communications receiver devices within that area, and a receiver for receiving a response signal from a wireless communications receiver device, wherein the stimulus signal causes multiple RF mixing products to be emanated from the wireless communications receiver device. As previously noted, this response is unexpected or otherwise unintentional, as receiver circuitry is generally not designed to transmit information. The system further includes a processor for performing locationing of the wireless communications receiver device, based on the response signal. In one particular case, the processor is configured for performing direction finding to the wireless communications receiver device (based on the response signal) and/or geolocation of the wireless communications receiver device (based on at least one of direction finding results or the response data). The stimulus signal may have, for example, a minimum power level of 0.5 Volts/meter, and/or a frequency that is outside known interference bands. In another example case, the stimulus signal has a frequency F1 and the wireless communications receiver device is powered-off. In one such case, the system may further include a second transmitter for transmitting a second stimulus signal having a frequency F2 (simultaneously with F1) to the area of interest to stimulate wireless communications receiver devices within that area, wherein the response signals include signals at one or more of the following frequencies 2F1−F2, 2F2−F1, 2F1, F1+F2, and/or 2F2.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

DETAILED DESCRIPTION OF THE INVENTION

Figure 1:
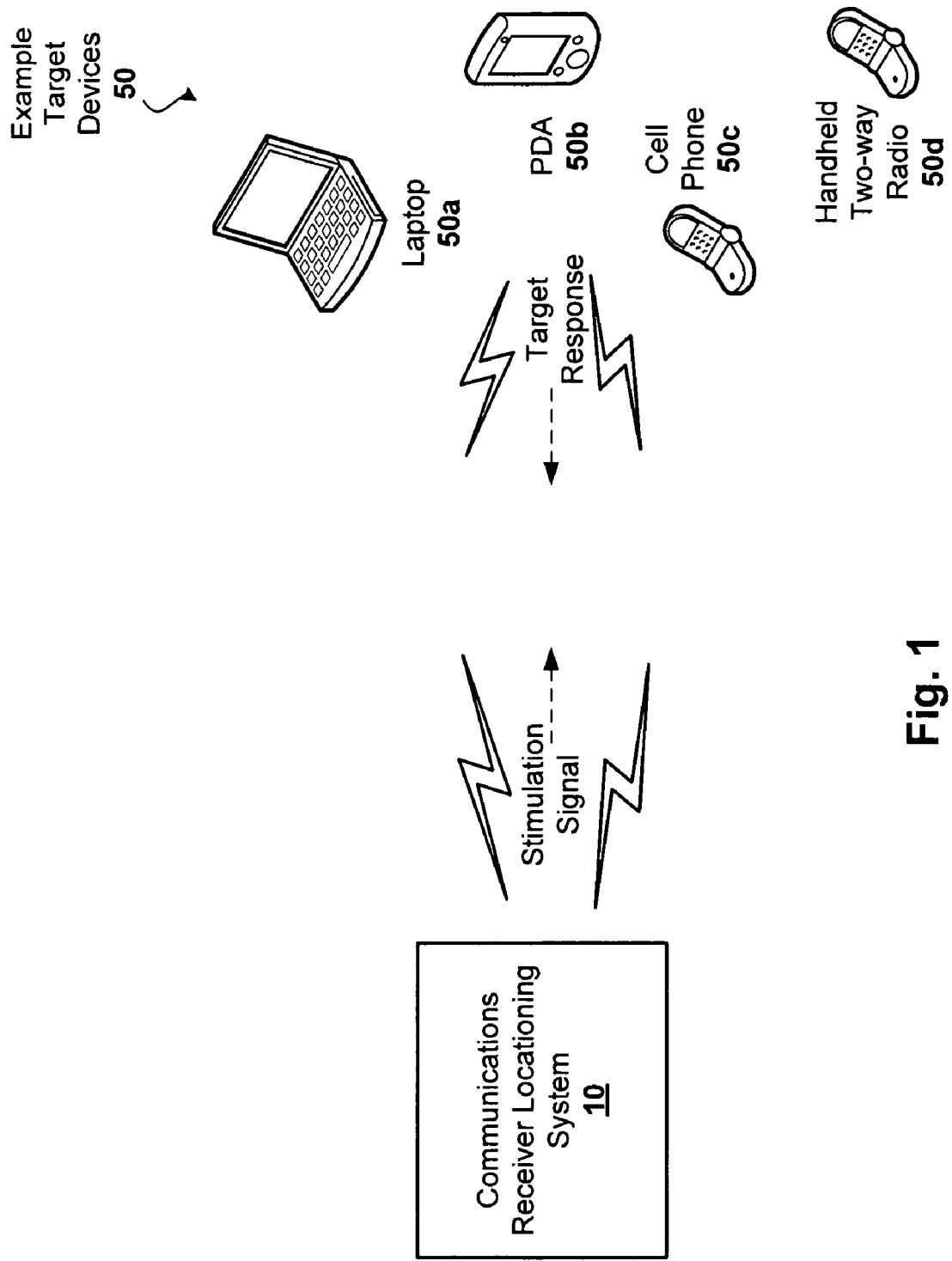
FIG. 1 illustrates a communications receiver detector and locationing system configured in accordance with an embodiment of the present invention.

Techniques are disclosed that allow for the detection, identification, and/or locationing of electronic devices in a given multipath and/or concealed environment. The devices that can be detected generally include any number of communication devices having a receiver configured with a mixer and local oscillator for frequency conversion between the transmission band and the processing band. As will be appreciated in light of this disclosure, such circuitry can be stimulated or otherwise exploited with a stimulus signal having sufficient power.

General Overview

A typical wireless communications device includes a receiver that allows the device to receive wireless signals. Some such devices may further include a transmitter circuitry as well, designed specifically for transmitting wireless signals from the device to other remote devices/nodes. Example devices include, for instance, handheld and mobile two-way radios such as walkie-talkie radios and family radio service (FRS) radios, high-power cordless telephones, cell phones, and any device having a general purpose communications receiver.

As is known, receivers typically include a local oscillator and mixer arrangement for converting a signal of interest to a different frequency. For instance, RF signals received at the device antenna are converted to an intermediate frequency (IF) signal for subsequent processing by the receiver circuitry. This frequency conversion, or so-called heterodyning, produces upper and lower sidebands, the upper sideband being the sum of the RF frequency and the local oscillator frequency and the lower sideband being the difference between the RF frequency and the local oscillator frequency.

An embodiment of the present invention provides an active RF system configured to exploit a vulnerability present in such communications receiver devices. The system can be used, for example, to detect and location two-way handheld radios, high-power cordless phones, cellular phones, and other commercial communications devices having the vulnerability. The vulnerability is that these devices emit upper and lower sideband RF signals when flooded or otherwise stimulated with RF energy. Parameters of these upper and lower sideband RF responses (such as RF frequency, phase, and amplitude) can be used to detect and location (e.g., geolocate) the devices using, for example, commercial off-the-shelf (COTS) receiver technology. The system, or target device, or both can be moving (or stationary) while the techniques are being executed.

In operation, a system configured in accordance with an embodiment of the present invention floods a search area with a stimulus signal (e.g., high-power RF energy). The communications receiver devices in that search area may be visible or not (i.e., concealed). The stimulus signal causes multiple RF mixing products (i.e., upper and lower sideband RF signals) to be emanated from the devices stimulated by the stimulus signal. In particular, the mixing products are generated by the receiver circuitry of the device, and emitted from the antenna receiver. Note that such an emission is not an intended emission (i.e., a receiver is designed to receive energy via an antenna, not to emit energy by that antenna). In any case, the system searches for and captures the emanated energy, and may characterize it to identify the responding device or devices. The system can also collect signal parameters from the emanated energy (e.g., phase and amplitude measurements) to location the device or devices. Locationing may include, for example, direction finding and/or geolocating the device.

In addition, the system and techniques described herein work in the presence of interference. For instance, the frequency of the stimulus signal can be adjusted such that the response signals can be moved or otherwise manifested outside the interference zone to which interference is applied or otherwise exists. In addition, the system may be configured to transmit a specific stimulus signal having parameters optimized or otherwise customized to a given target device. In addition, the system and techniques can detect, identify, and location communications devices that are powered-on (by exploiting the presence of an active local oscillator) or off (by effectively providing a surrogate local oscillator signal).

Communications Receiver Locating System

FIG. 1 illustrates a communications receiver detector and locationing system 10 configured in accordance with an embodiment of the present invention. The system 10 can be implemented, for example, in a vehicle-based platform (ground-based platform, airborne platform, or vessel platform) or suitcase-based platform to allow for portable detection, identification, and/or locationing of wireless receivers in a given multipath and/or concealed environment.

As can be seen, system 10 is capable of transmitting stimulus signals to its field of view (FOV), and receiving responses from any number of communication devices 50 located in that FOV. The example devices 50 depicted include laptop 50a, PDA 50b, cell phone 50c, and handheld two-way radio 50d (e.g., FRS radio). In a more general sense, a target device 50 can be any number of devices having a communications receiver that includes a mixer and local oscillator for frequency conversion between transmission band and processing band, or other such circuitry that can be similarly exploited as described herein. Thus, system 10 transmits a stimulus signal to effectively survey the FOV for devices 50.

The stimulus signal transmitted by system 10 may be, for example, a high-power RF signal in the range of 50 MHz to several GHz at about 10 watts to 1000 watts (e.g., 700 MHz at 50 watts). The power of the stimulus signal generally depends on factors such as the distance to the target device. In one embodiment, the minimum power level of the stimulus signal is 0.5 Volts/meter, which represents power over an area between the system 10 and the responding device. Additional power in the stimulus signal translates directly into standoff range to the target. So more power generally can be used to survey a larger area all at once. Other stimulus signal parameters (if any), such as modulation type, envelope modulation, depending on complexity of stimulus signal, can be set to provide a specific responses (e.g., as established by theoretical or empirical analysis). In addition, the stimulus signal can be set to a frequency range outside a known interference zone, as will be further discussed in detail with reference to FIG. 3a.

During the survey processes where a stimulus signal is transmitted to a target area, the response from a device 50 provides information about that device. For instance, devices 50 emit from their receiver circuitry upper and lower sideband RF signals when flooded with RF energy, as will be further discussed in detail with reference to FIGS. 3b and 3c. The RF frequency, phase, and/or amplitude of these upper and lower sideband RF signal responses can be used to detect and specifically identify, as well as locate (e.g., direction find and/or geolocate) the device 50. For example, amplitude information received from a target device can be used to compute a line of bearing (LOB) to the target device 50. Multiple LOBs measured from two or more vantage points can be used to geolocate the target device 50. In addition, the sideband information (e.g., distance in Hertz from stimulus signal) tends to be unique to a particular device, which can therefore be used to specifically identify the target device 50. Thus, pertinent information about the potential target devices 50 in the FOV of locationing system 10 can be acquired by a survey, and the system 10 can then identify the responding device, as well as location that target device 50.

The devices 50 can be located, for example, in a building or outdoors in a park area or along a roadside. In addition, a device 50 may be powered-on, or powered-off. The system 10 can be located in the same building, a different building, or outside as well. In short, system 10 can detect, direction find, and/or geolocate devices 50 regardless of the environment (multipath or not) associated with the respective locations of system 10 and devices 50. The distance between the system 10 and devices 50 can vary depending on factors such as transmit power and the frequency spectrum employed. In an embodiment using frequencies in the UHF and/or VHF spectrum, the distance can be, for instance, out to hundreds of meters.

Figure 2A:
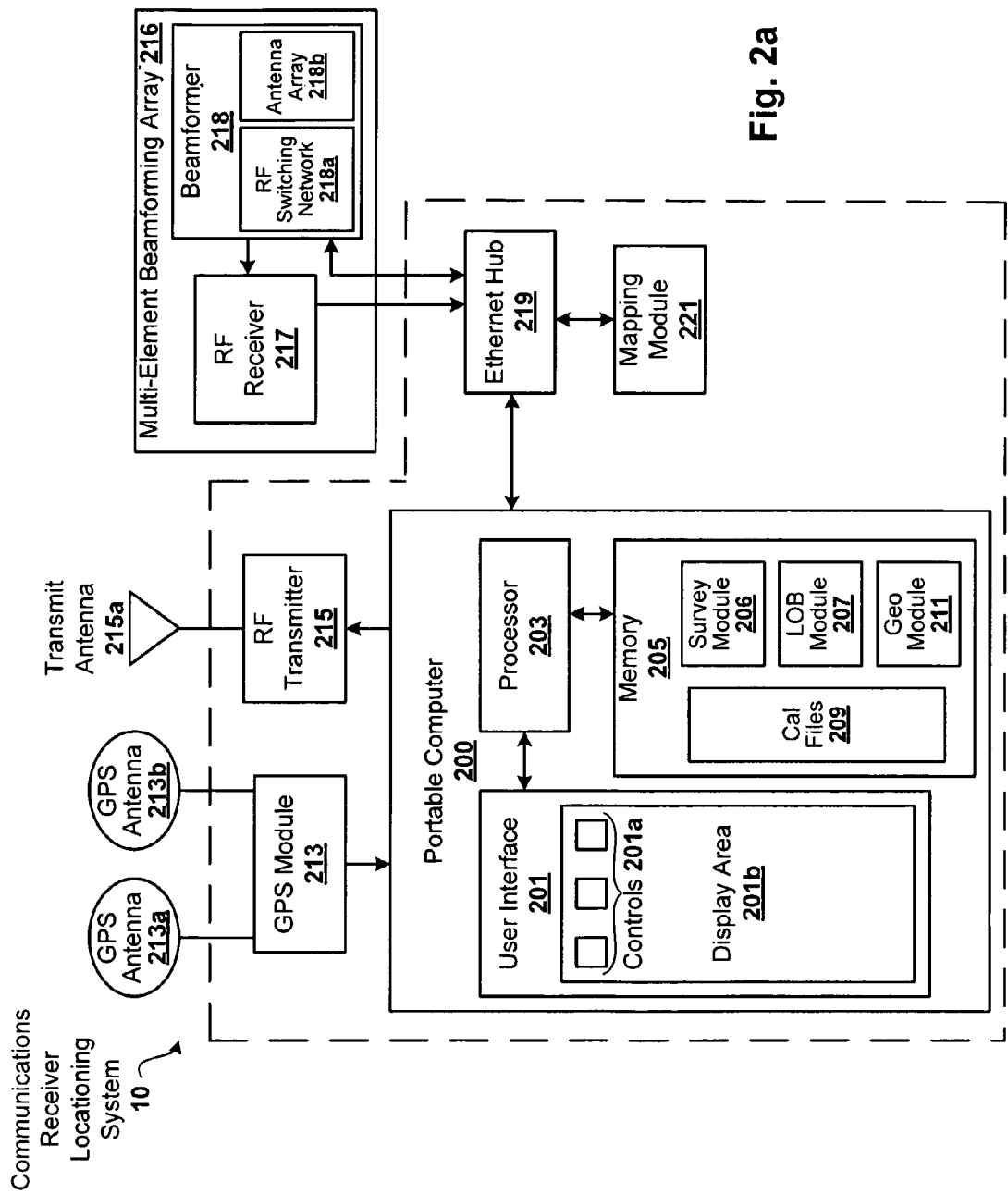
FIG. 2a illustrates a detailed block diagram of the communications receiver detector and locationing system 10 shown in FIG. 1, configured in accordance with an embodiment of the present invention.

FIG. 2a illustrates a detailed block diagram of the system 10, configured in accordance with an embodiment of the present invention. As previously explained with reference to FIG. 1, the system 10 is capable of identifying potential target wireless devices, and computing one or more LOBs to a target device. The system can then geolocate the target device, based on an intersection of LOBs from multiple vantage points and/or GPS position and heading tags associated with each computed LOB, as will be discussed in turn.

As can be seen, the system 10 generally includes a portable computer 200, a multi-element beamforming array 216, a GPS module 213 and GPS antennas 213a-b, an RF transmitter 215 and transmit antenna 215a, an Ethernet hub 219, and an optional mapping module 221. The multi-element beamforming array 216 includes an RF receiver 217 and a beamformer 218 that includes an RF switching network 218a and a multi-element antenna array 218b. The computer 200 includes a user interface 201 having controls 201a and display area 201b, a processor 203, and a memory 205. The memory 205 includes calibration files 209, an LOB module 207, and a geolocation (Geo) module 211. Other conventional componentry not shown will be apparent in light of this disclosure (e.g., busses/coupling mechanisms, storage mechanisms, co-processor, graphics card, operating system, user interface mechanisms, etc). The system may be powered by batteries, or may derive its power from other sources, such as a vehicle in which the system is operating or a generator. Any number of suitable power schemes can be used here.

In operation, the RF transmitter 215 generates RF signals which are then transmitted by antenna 215a (e.g., dish or horn antenna for suitable transmitting a wash signal) to stimulate a target device 50 and multi-element antenna array 216 captures response signals from the target device 50. The multi-element antenna array 216 is capable of providing coverage of the spectrum of interest in azimuth (horizontal field of view), and optionally in elevation (vertical field of view) and polarization (frequency), if so desired. The RF switching network 218a is configured to select elements of the antenna array 218b (based on control signals provided by computer 200). Signals received via the beamformer 218 are the processed by the RF receiver 217, and provided to the computer 200 for processing via the Ethernet hub 219. Each of the RF receiver 217 and beamformer 218 can be implemented with commercial off-the-shelf (COTS) equipment. The direction finding and geolocation carried out using the RF receiver 217 and beamformer 218 may be implemented as described in U.S. Pat. No. 7,233,285 (Correlation Interferometer Geolocation) and U.S. Pat. No. 7,358,891 (Multipath Resolving Correlation Interferometer Direction Finding), each of which is incorporated herein in its entirety by reference. Alternatively, the direction finding and geolocation carried out using the RF receiver 217 and beamformer 218 may be executed as described with reference to FIGS. 5a-c.

The computer 200 can be implemented with conventional technology, including display area 201b (e.g., LCD display), processor 203 (e.g., Intel® Pentium® class processors, or other suitable microprocessors), and memory 205 (e.g., any RAM, ROM, cache, or combination thereof typically present in computing devices). However, as will be explained in turn, the LOB module 207, calibration files 209, and geolocation module 211 are programmed or otherwise configured to carryout functionality described herein. Likewise, user controls provisioned for the user interface 201 (such as controls 201a) may be programmed or otherwise configured to control and/or task the system 10 to carryout functionality described herein. In some specific embodiments, the computer 200 can be implemented, for example, with a miniature or so-called ultra mobile computer, such as the OQO model 2+ produced by OQO, Inc., or the VAIO® UX Series Micro PC produced by Sony Corporation. A full-size laptop computer having similar functionalities can be used as well. Any number of small portable computing platforms can be used to implement computer 200.

The LOB module 207 is programmed or otherwise configured to convert a response signal from RF receiver 217 into a line of bearing (LOB) relative to the current position and orientation of array 218b. The geolocation module 211 is programmed or otherwise configured to identify the actual location of the target device on the LOB, based on the intersection of LOBs from multiple vantage points (e.g., on a map display) and/or GPS position and heading tags associated with each computed LOB. For instance, in the example embodiment shown in FIG. 2a, the system includes GPS module 213 and its corresponding antennas 213a-b, so that each LOB to a target device can be associated with position and heading tags. The GPS module 213 and antennas 213a-b can be implemented with conventional GPS receiver and antenna technology. In one example embodiment, GPS module 213 is implemented with a Crescent® Vector OEM board produced by Hemisphere GPS, Inc. This particular GPS board, which can be operatively coupled to computer 200 by an RS-232 serial port or otherwise integrated into computer 200, provides a GPS compass and positioning system that computes heading and positioning using two antennas for greater precision. Other suitable GPS receivers can be used as well, as will be apparent in light of this disclosure. In any such cases, the geolocation module 211 can accumulate bearings provided by GPS module 213 to produce a geolocation, which can then be provided, for instance, on a map display.

The user interface 201, including controls 201a and display 201b, allows the user to control and task the system 10. In one specific case, the LOB results can be mapped or shown on a polar plot to indicate in real time the direction to the target device. The user interface 201 may include, for example, a probe button that when pressed or otherwise selected initiates transmission of a stimulus signal by the transmitter 215 and antenna 215a to a target device, so that the signal response emitted from receiver circuitry of the device can be received at the multi-element antenna array 216 over multiple antenna configurations to provide a sample array of response data for that device. The multiple antenna configurations can be selected, for example, automatically by the control provided to the RF switching network 218a and antenna array 218b computer 200, or by operation of the beamformer 218 itself. The array of response data can then be analyzed by the LOB module 207 to identify an LOB to the target device. In addition, the computer 200 may be configured to direct transmitter 215 to transmit a specific stimulus signal having parameters customized to a given target device. In any such cases, the computer 200 receives the response signals from receiver 217 of array 216 for processing by the LOB module 207. The geolocation module 211 can then compute a specific location based on the computed LOBs.

Each of the modules 207 and 211 can be implemented, for example, as a set of instructions or code that when accessed from memory 205 and executed by the processor 203, cause direction finding and geolocation techniques described herein to be carried out. In addition, the user interface 201 can be programmed or otherwise configured to allow for functionality as described herein (e.g., wherein controls 201a are implemented as graphical user interface with touch screen functionality). The calibration files 209 effectively make up entries in a database that can be, for example, any suitable data storage populated with gold-standard response data having a known azimuth to which test data can be correlated. The gold-standard response data may be, for instance, empirical data measured by the system 10 in a multipath environment under known conditions (e.g., where the azimuth/LOB from the antenna array 218b to the target emitter device 50 is known, and a full set of calibration measurements are taken at each known azimuth). Alternatively, the gold-standard response data can be theoretical data (assuming the theoretical data is sufficiently accurate to provide accurate results). In any such cases, the database 209 can be populated with gold standard data for any number of azimuths. The number of azimuths represented in the database 209 can vary depending on factors such as the desired azimuthal resolution and FOV. In one example embodiment, the FOV is assumed to be 360° with a desired resolution of 1° (i.e., 360 azimuths). Other embodiments may have a narrower FOV and/or a finer resolution (e.g., an FOV of 360° and a resolution of 0.1°, wherein there are 3600 azimuths; or an FOV of 180° and a resolution of 1°, wherein there are 180 azimuths; or an FOV of 360° and a resolution of 20°, wherein there are 18 azimuths; or an FOV of 90° and a resolution of 2.0°, wherein there 45 azimuths. As will be appreciated in light of this disclosure, the azimuthal resolution and FOV will depend on the particular demands of the application at hand. The azimuth entry in the database having the calibrated array of data that best matches or otherwise correlates to the measured array of data directly corresponds to the LOB to the target device associated with the measured array of data.

In other embodiments, the calibration files 209, each of the modules 207 and 211, and any graphical user interface (GUI) such as controls 201a, can be implemented in hardware such as purpose-built semiconductor or gate-level logic (e.g., FPGA or ASIC), or otherwise hard-coded. In other embodiments, calibration files 209, modules 207 and 211, and GUI 201a may be implemented with a combination of hardware and software, such as with a microcontroller having input/output capability for providing control signals to receiver 217 and beamformer 218, and for receiving response data from receiver 217, and a number of embedded routines for carrying out direction finding and geolocation techniques described herein.

The optional mapping module 221 can be used to provide map displays upon which computed LOBs and/or geolocation markers can be overlayed or otherwise integrated. In one such embodiment, the mapping module 221 is a satellite based mapping system (e.g., Google Earth™ mapping service) executing on a secondary computer system (e.g., laptop similar to computer 200). Alternatively, the mapping module 221 can be implemented on computer 200. In one such case, the display area 201b of the user interface 201 provides a map display area having LOBs and the vehicle path overlayed thereon (assuming a vehicle-based system 10). Other information may also be included, as will be discussed with reference to FIG. 4.

The Ethernet hub 219 can be implemented with conventional technology, and operatively couples various components of system 10 to effectively provide a communication network by which those components can communicate. In the example embodiment shown, each of computer 200, mapping module 221, and multi-element beamforming array 216 are coupled to the Ethernet hub 219 by respective Ethernet ports provided with each. Any number of conventional networking/connectivity technologies can be used here to operatively couple the components of system 10, and embodiments are not intended to be limited to Ethernet based solutions.

Figure 2B:
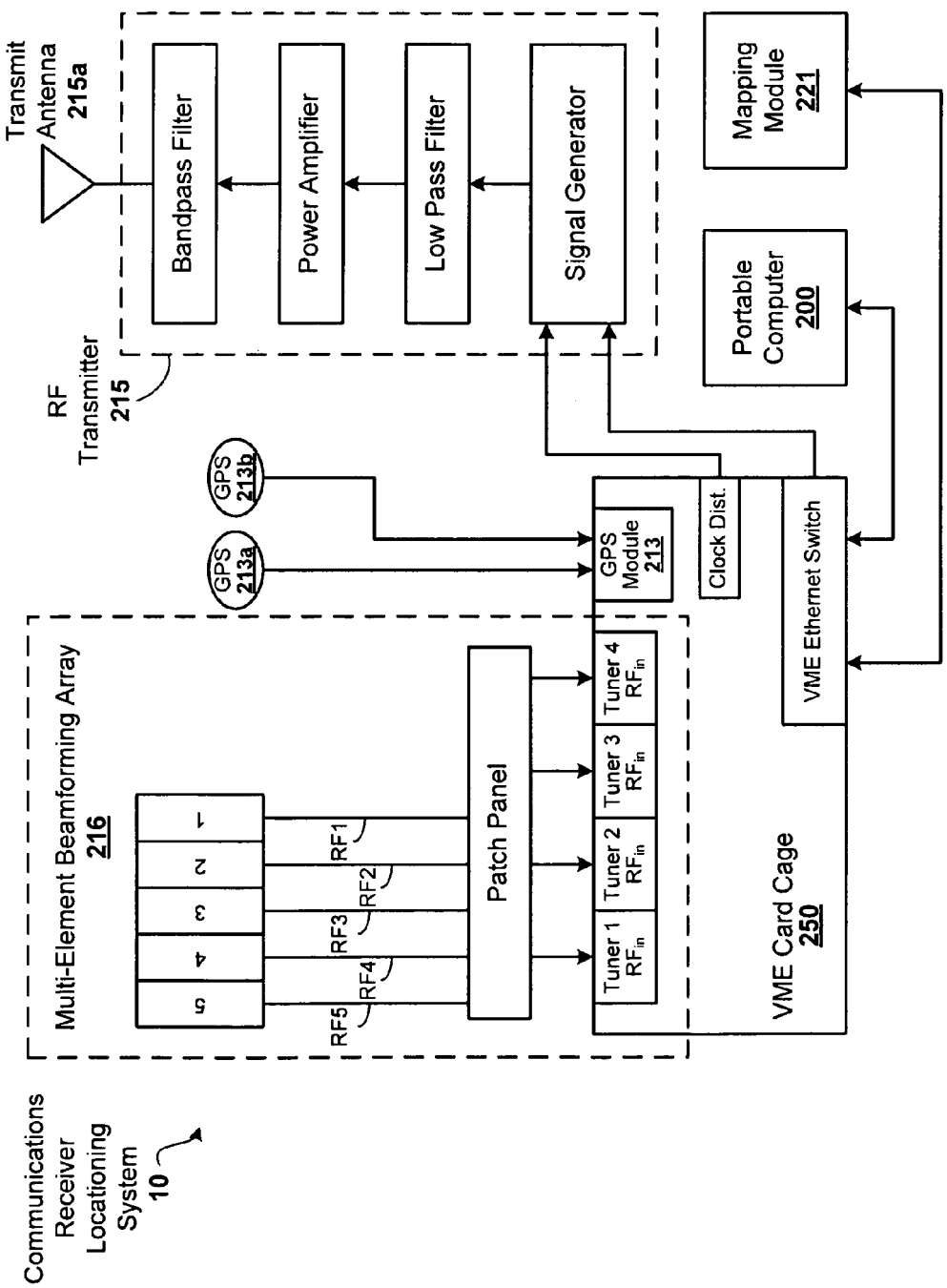
FIG. 2b illustrates a detailed block diagram of the communications receiver detector and locationing system 10, configured in accordance with another embodiment of the present invention.

FIG. 2b, for example, illustrates a detailed block diagram of the system 10, configured in accordance with another embodiment of the present invention. This example embodiment functions similar to the embodiment described with reference FIG. 2a, but employs a VME card cage 250 for operatively coupling various components of the system (instead of the Ethernet hub 219). In more detail, this alternative embodiment system 10 includes a portable computer 200, a multi-element beamforming array 216, a GPS module 213 and GPS antennas 213a-b, an RF transmitter 215 and transmit antenna 215a, a VME card cage 250, and an optional mapping module 221.

As can be seen, the multi-element beamforming array 216 of this example includes five antenna elements operatively coupled to four receiver (or 'tuner') modules (Tuner 1-Tuner 4) via a patch panel to provide a four channel antenna array capable of capturing data for direction finding and/or geolocation. The tuners can be implemented, for example, by two DRS 9136B dual-channel tuners (two channels per tuner, so as to provide four receive channels total). As is known, the DRS 9136B (produced by DRS Technologies, Inc) is dual-channel wideband VHF/UHF tuner that provides independent and/or phase-coherent conversion of RF signals in the range of 20 to 3000 MHz in a 6U VME single-slot module. Switching control is provided via the VME cage 250 from computer 200, which is operatively coupled to the VME cage 250 via a VME Ethernet switch. Just as with the embodiment of FIG. 2a, the direction finding and geolocation performed using the multi-element beamforming array 216 (which includes receiver and beamforming functionality) can be carried out as described in the previously incorporated U.S. Pat. Nos. 7,233, 285 and 7,358,891.

The RF transmitter 215 of this example embodiment is implemented with a signal generator (e.g., E4432B digital RF signal generator, 3 GHz, by Agilent Technologies, Inc) having a low pass filter on its output to remove unwanted higher frequencies. The filter passband will depend on the particulars of the given application, and some applications may use a bandpass filter to eliminate undesired frequencies above and below the frequency band of interest. In addition, the transmitter 215 includes a power amplifier (e.g., Ophir 5126 RF Amplifier 20-1000 MHz, 120 watts, by Ophir RF, Inc) for amplifying the signal to the desired power level. The bandpass filter on the output of the power amplifier can be used to eliminate any extraneous signals produced by the amplification process, and will have its passband set accordingly.

In operation, the RF transmitter 215 generates RF signals which are then transmitted by antenna 215a (e.g., dish or horn antenna for suitable transmitting a wash signal) to stimulate a target device 50 and multi-element antenna array 216 captures response signals from receiver circuitry of the target device 50. The multi-element antenna array 216 is capable of providing coverage of the spectrum of interest in azimuth (horizontal field of view), and optionally in elevation (vertical field of view) and polarization (frequency), if so desired. The RF switching network 218a is configured to select elements of the antenna array 218b (based on control signals provided by computer 200). Signals received via the beamformer 218 are the processed by the RF receiver 217, and provided to the computer 200 for processing via the Ethernet hub 219. Each of the RF receiver 217 and beamformer 218 can be implemented with commercial off-the-shelf (COTS) equipment. The direction finding and geolocation carried out using the RF receiver 217 and beamformer 218 may be executed as described in U.S. Pat. No. 7,233,285 (Correlation Interferometer Geolocation) and U.S. Pat. No. 7,358,891 (Multipath Resolving Correlation Interferometer Direction Finding), each of which is incorporated herein in its entirety by reference. The signal generator is operatively coupled to the VME card cage via the VME Ethernet switch and the clock distribution circuitry (for synchronization purposes). In this example embodiment, the GPS module 213 (e.g., Crescent® Vector OEM board produced by Hemisphere GPS, Inc) is plugged into the VME card cage 250, and as previously explained provides a GPS compass and positioning system that computes heading and positioning using two antennas for greater precision. The previous discussion with reference to the computer 200 and it componentry, including the user interface 201, calibration files 209, LOB module 207, and geolocation module 211, is equally applicable here, as is the previous discussion with relevant to the mapping module and techniques for computing LOBs and geolocations.

Figure 2C:
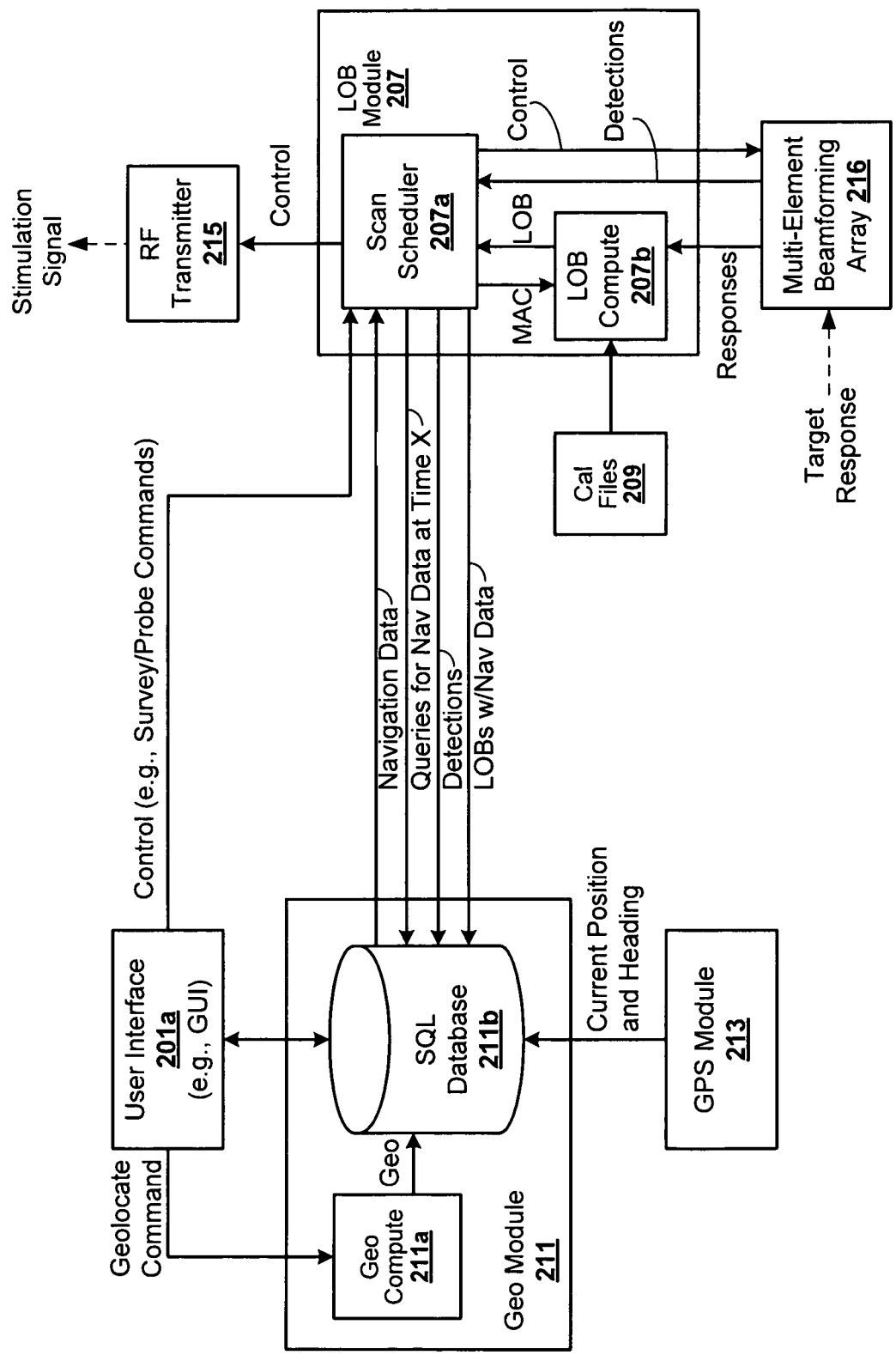
FIG. 2c illustrates further details of the communications receiver detector and locationing system 10, configured in accordance with an embodiment of the present invention.

FIG. 2c illustrates further details of the system 10, with respect to the geo module 211 and the LOB module 207, in accordance with an embodiment of the present invention. As can be seen, the geo module 211 includes a geo compute module 211a and a SQL database 211b, and the LOB module 207 includes a scan scheduler 207a and an LOB compute module 207b. In general, computing multiple LOBs as the system 10 is actively moving (such as the case of a vehicle-based system 10) gives rise to various timing issues and can generate a significant amount of data. For instance, example timing considerations may involve when the next survey or probe should take place and on what channels, and example data includes target device detections, multiple LOBs, and corresponding navigation data for each of a plurality of points along the travel path of system 10. To this end, the scan scheduler 207a directs scheduling of system 10 operations in response to user probe commands (from user interface 201a), and SQL database 211b efficiently stores (and makes accessible) pertinent data to the system 10.

In more detail, the scan scheduler 207a of this example embodiment is programmed or otherwise configured to direct the RF transmitter 215 to transmit a stimulus signal to effectively survey the FOV of system 10 for target communication devices. The scheduler 207a specifies the channel to survey. For instance, the scheduler 207a may sequentially schedule scans for each available channel associated with a given protocol (e.g., IEEE 802.11). The multi-element beamforming array 216 provides any detections for each such survey back to the scan scheduler 207a, which then stores those detections (along with any pertinent learned information, such as device type/model and/or manufacturer, MAC address, channel, encryption status, etc) in database 211b. Note that although SQL technology is used in this example, other suitable database technologies can be used as well. The scan scheduler 207a can then select any of the detected target devices (e.g., based on any suitable identifier learned based on response to stimulus signal), and instruct the LOB compute module 207b to compute an LOB for that particular target device at that current location of the system 10. For each LOB provided by module 207b to scheduler 207a, the scheduler 207a queries the database 211b for navigation data at that particular time (time X). As can be further seen, the database 211b responds by sending the scheduler 207a the appropriate navigation data. The scheduler 207a then stores the LOB along with its corresponding navigation data to the database 211b. In the example embodiment shown, scan scheduler 207a also directs the beamforming array 216 in conjunction with module 207b. In alternative configurations, module 207b can direct beamforming array 216 after scheduler 207a instructs module 207b. Additional details of how module 207b operates and interacts with the cal files 209 and beamforming array 216 are provided with reference to FIGS. 5a-c.

As previously explained, the GPS module 213 provides current heading and position data, which is also stored in the database 211b and made available the LOB module 207. The geo compute module 211a is programmed or otherwise configured to compute, in response to a geolocate command from the user (via interface 201a), a geolocation for the specified target device. As previously explained, the geolocation can be computed based on the intersection of the corresponding LOBs and/or the navigation data (position/heading tags) associated with those LOBs. The computed geolocation can then be stored in the database 211b by module 211a.

Figure 2D:
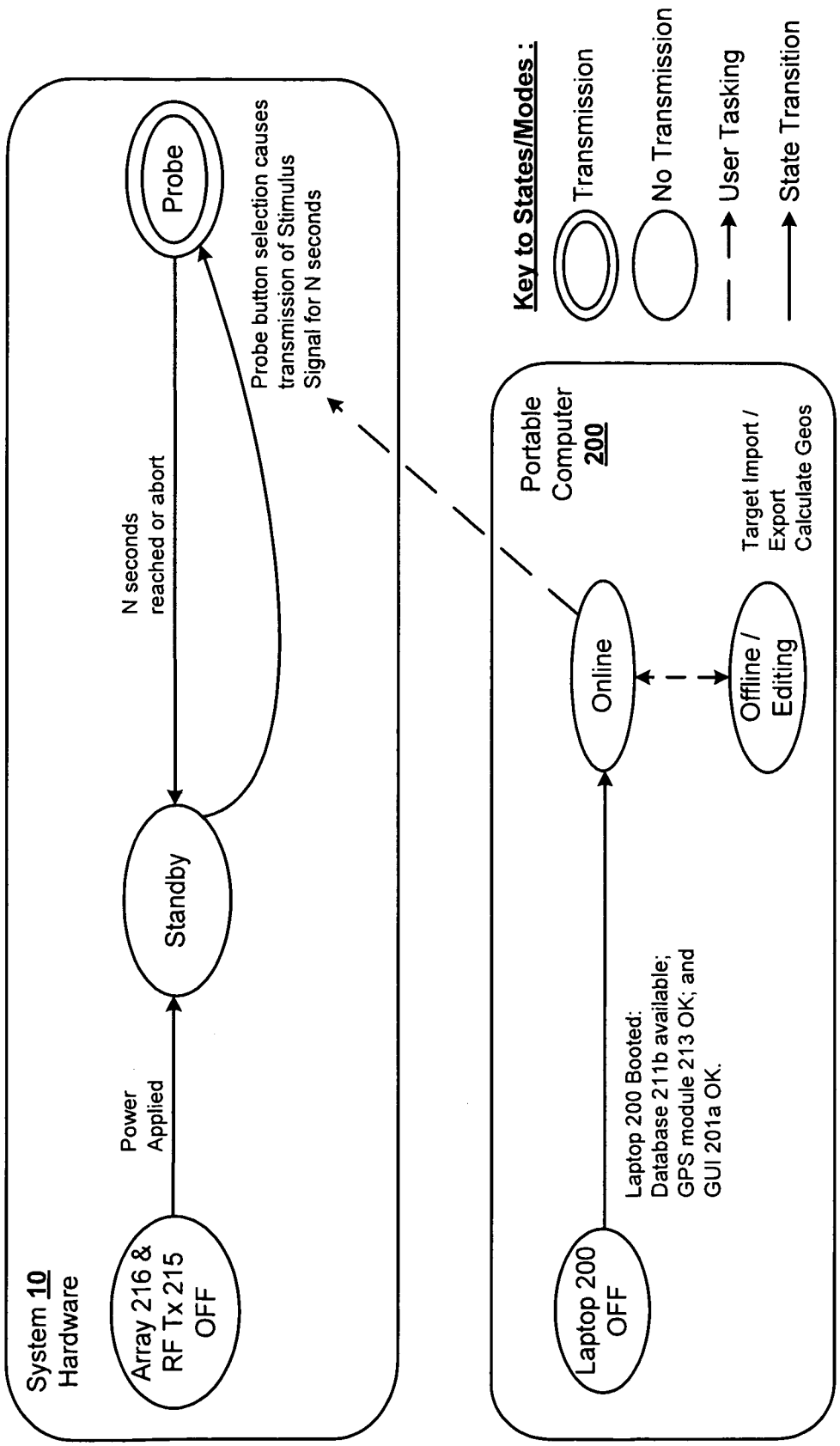
FIG. 2d illustrates example states and modes of the communications receiver detector and locationing system 10, in accordance with an embodiment of the present invention.

FIG. 2d illustrates example states and modes of the system 10, in accordance with an embodiment of the present invention. As can be seen, the diagram includes two main portions: one for the computer 200 (which is a laptop in this example) and another for other hardware (transmitter 215 and array 216) of system 10. At power-up, the system 10 transitions from its OFF state to its Online state, where upon the database 211b becomes available and modules 201a and 213 come online. During an Offline/Editing state, only the computer 200 (with its modules and database 211b) may be powered-on (e.g., leave module 213 powered-down or in low power mode to conserve power), which allows for offline tasks such as importing/exporting data and computing of geolocations.

Once computer 200 is in its Online state, the user may task system 10 hardware to probe or otherwise transmit a stimulus signal to the FOV. To conserve power, note that transmitter 215 and array 216 can be powered-down or held in a low power mode during extended periods of not receiving any user tasks. Once a task is received, the system 10 can transition from a Standby state to a Probe state. For instance, selecting the probe button (or other user interface mechanism) causes system 10 to transition to the Probe state for transmitting a stimulus signal to the FOV. If after N seconds (e.g., 5 to 15 seconds) no response is received from any target devices within the FOV, system 10 may transition back to the Standby state. Any number of timing/abort schemes for controlling state transition can be used here. In operation, a target device within the search area of system 10 effectively responds to the stimulus signal by emitting RF energy from its receiver antenna (e.g., upper and lower sidebands of mixer/local oscillator circuitry) back to the system 10. The multi-element beamforming array 216 collects response data, such that the system 10 can simultaneously detect the presence of one or more concealed targets, identify those targets, and location those targets (e.g., geolocate to +/−3 meters).

Interference Avoidance

Figure 3A:
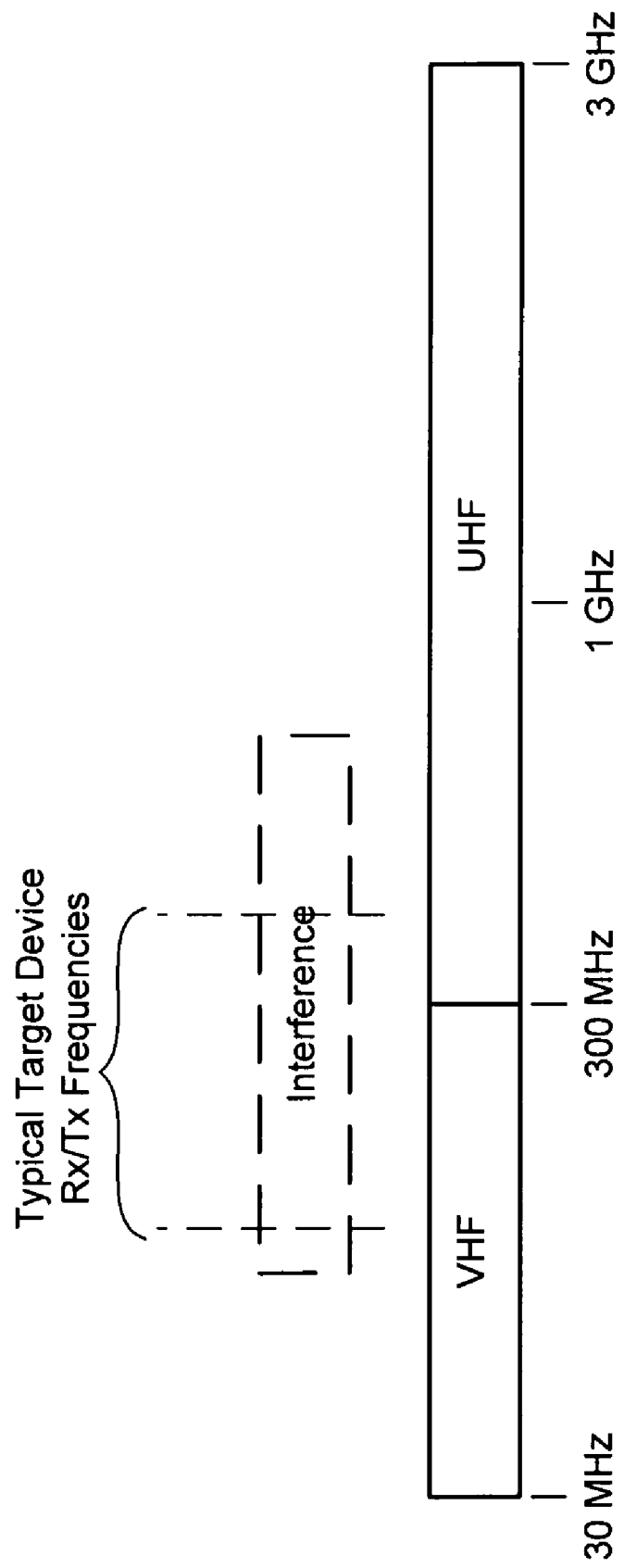
FIG. 3a illustrates example target device RF activity within a given frequency spectrum susceptible to various types of interference.

As previously explained, the system 10 functions in the presence of interference. In more detail, FIG. 3a illustrates example target device RF activity within a given frequency spectrum. As can be seen, the transmit and receive frequencies of the example target devices (e.g., cell phones, high-power cordless telephones, FRS radios, etc) are within the frequency spectrum of about 20 MHz to 1 GHz (generally, the VHF and lower UHF frequency band). This frequency spectrum is also susceptible to various types of interference, whether intentional or not.

Figure 3B:
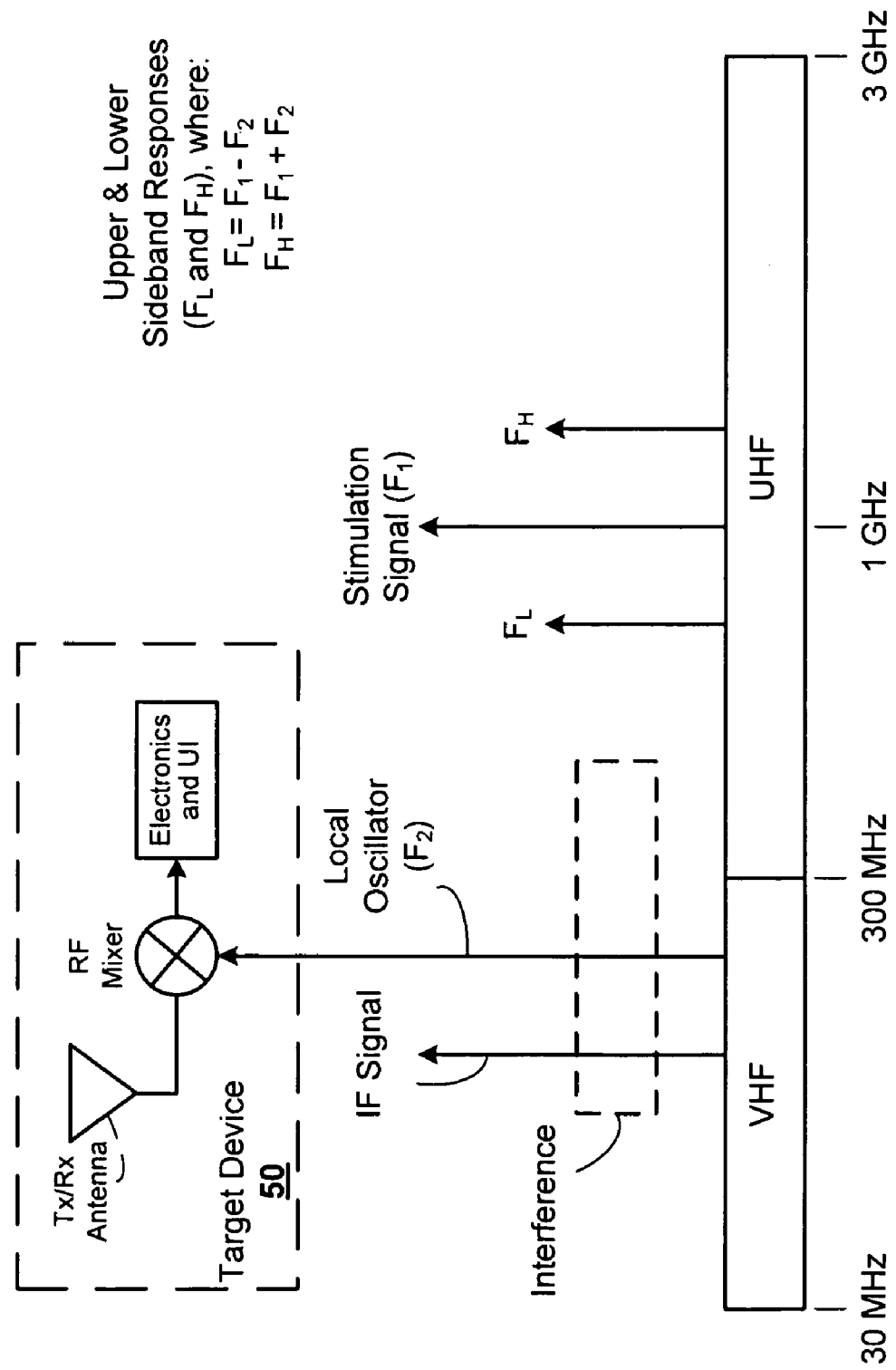
FIGS. 3b and 3c each illustrate how the communications receiver detector and locationing system 10 can be used to provide a stimulus signal that causes response signals to be emanated from the target device, wherein those response signals are outside the interference band.

FIG. 3b illustrates how the system 10 can be used to provide a stimulus signal that causes response signals to be emanated from receiver circuitry of the target device, wherein those response signals are outside the interference band. As can be seen, the target device 50 includes typical RF communications device componentry, including a transmit/receive antenna, and RF mixer, a local oscillator. The target device 50 may further include other electronics and user interface (UI) componentry/modules. The device 50 operating frequency is the local oscillator frequency ($F_2$), and intermediate frequency (IF) is shown as well, both in the under 300 MHz range. As can be further seen, the stimulus signal ($F_1$) provided by the RF transmitter 215 of system 10 is around 1 GHz in this example, which is outside the interference band. Also shown in FIG. 3b is the lower sideband ($F_L$) and the upper sideband ($F_H$), which are automatically produced by the powered-on circuitry of the target device 50 in response to the stimulus. The upper and lower sideband responses can be computed as $F_H=F_1+F_2$, and $F_L=F_1-F_2$, respectively. Detecting a powered-down device 50 will be discussed with reference to FIG. 6.

Figure 3C:
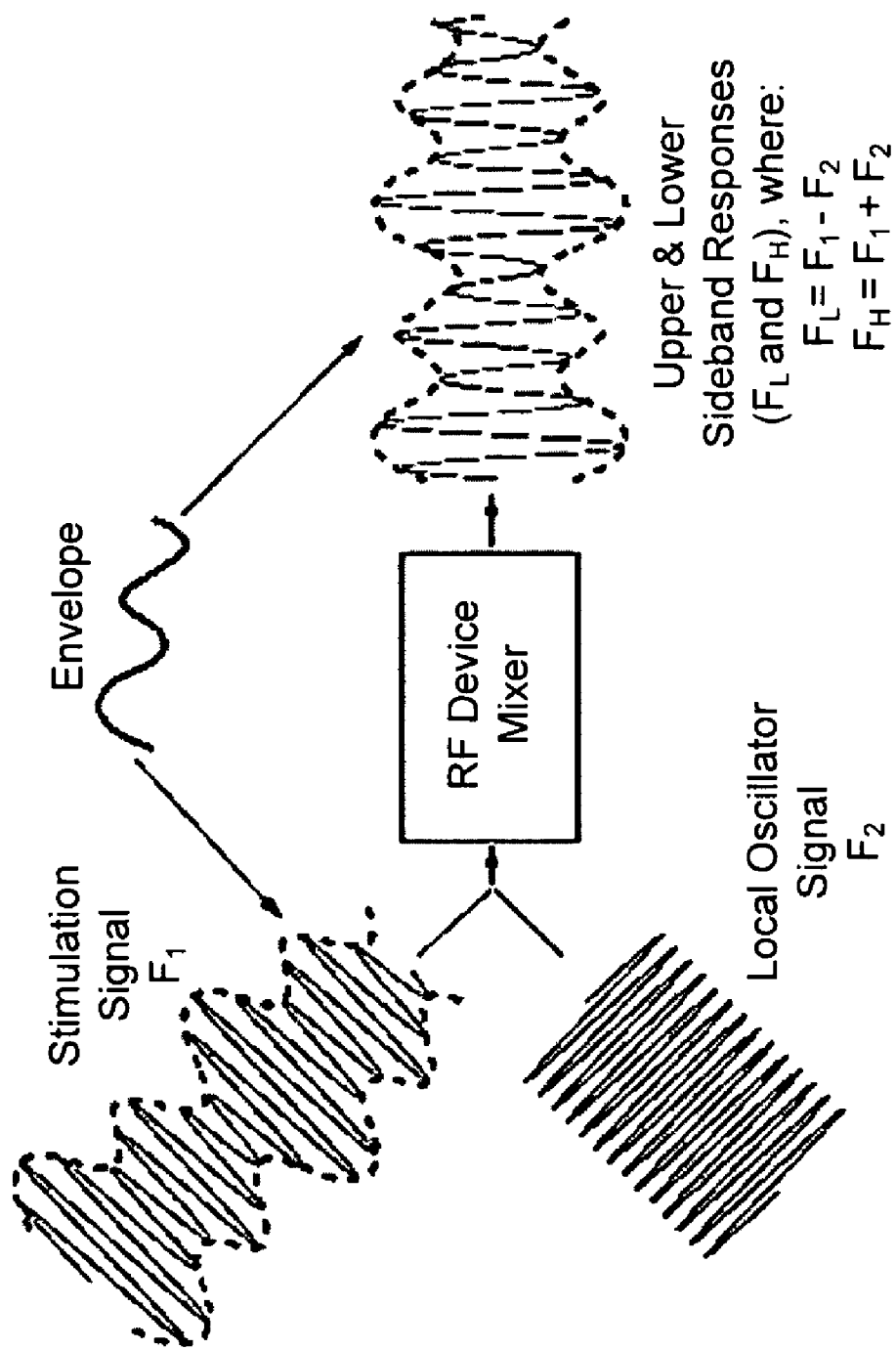

FIG. 3c illustrates this process graphically, whereby the stimulation signal $F_1$ is combined with the local oscillator signal $F_2$ in the mixer of the target device 50 to provide the upper sideband $F_H$ and lower sideband $F_L$ responses. In the example shown in FIG. 3c, note that the envelope of the stimulation signal provided by transmitter 215 defines the envelope of the upper sideband $F_H$ and lower sideband $F_L$ responses. Further note that the responses are not masked or otherwise interfered with.

User Interface

Figure 4:
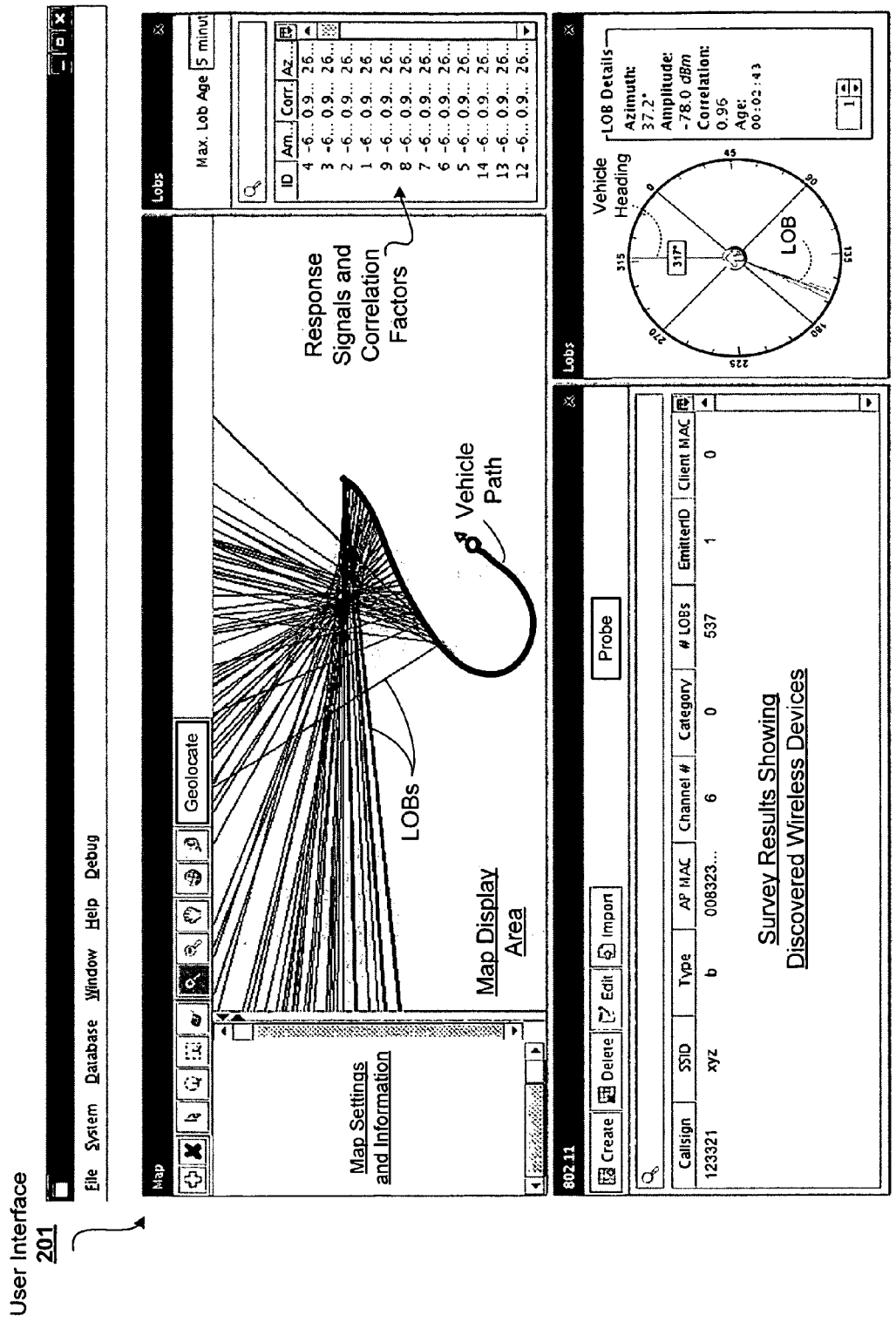
FIG. 4 illustrates an example user interface of the communications receiver detector and locationing system 10, in accordance with an embodiment of the present invention.

FIG. 4 illustrates an example user interface 201 of the system 10, in accordance with an embodiment of the present invention. As can be seen, the interface 201 is implemented within a browser and includes a map display area for displaying multiple LOBs computed by the system 10 as well as the vehicle's path. Map setting and information can also be provided, to allow the user to configure the map as desired (e.g., to show more or few details, zoom level, labels, etc).

An LOB resulting from the process carried out by LOB module 207 is visually depicted on a polar plot, along with the vehicle heading, to indicate in real-time the direction to the target device relative to the current position and orientation of array 216. As can be further seen, specific LOB details may also be displayed to ease the user's viewing, if so desired.

Also shown above the LOB polar plot are response signals and the corresponding correlation factors computed by the system 10 as described herein. As can be seen, each response signal parameter of amplitude (Am . . . ) that has been measured has an ID value and corresponds to a computed correlation factor (Corr.) and a corresponding azimuthal (Az . . . ) value. The user may search this data and/or scroll the data for review. In this specific example, the user can also specify a maximum LOB age (to prevent stale readings), if so desired.

The interface 201 of this example further includes a section for survey results showing discovered target devices and corresponding information associated with each such device. The information may include, for instance, a callsign, SSID, type of emitter, if applicable (e.g., 802.11b, 802.11g, etc), target MAC address, communication channel, category (e.g., 0=unencrypted; 1=encrypted), the number of LOBs computed for the device (if any), device ID (if assigned), device manufacturer and model, and the client MAC (which may be helpful in embodiments where there is more than one system 10 providing information to a central processing or command workstation.

The interface 201 of this example further includes a Probe button (e.g., touch screen activated or otherwise selectable by the user) for initiating transmission of a stimulus signal. The interface further includes a Geolocate button, which initiates a geolocation computation for a selected device based on its LOBs and associated navigation data, as described herein.

Line of Bearing Determination

Figure 5A:
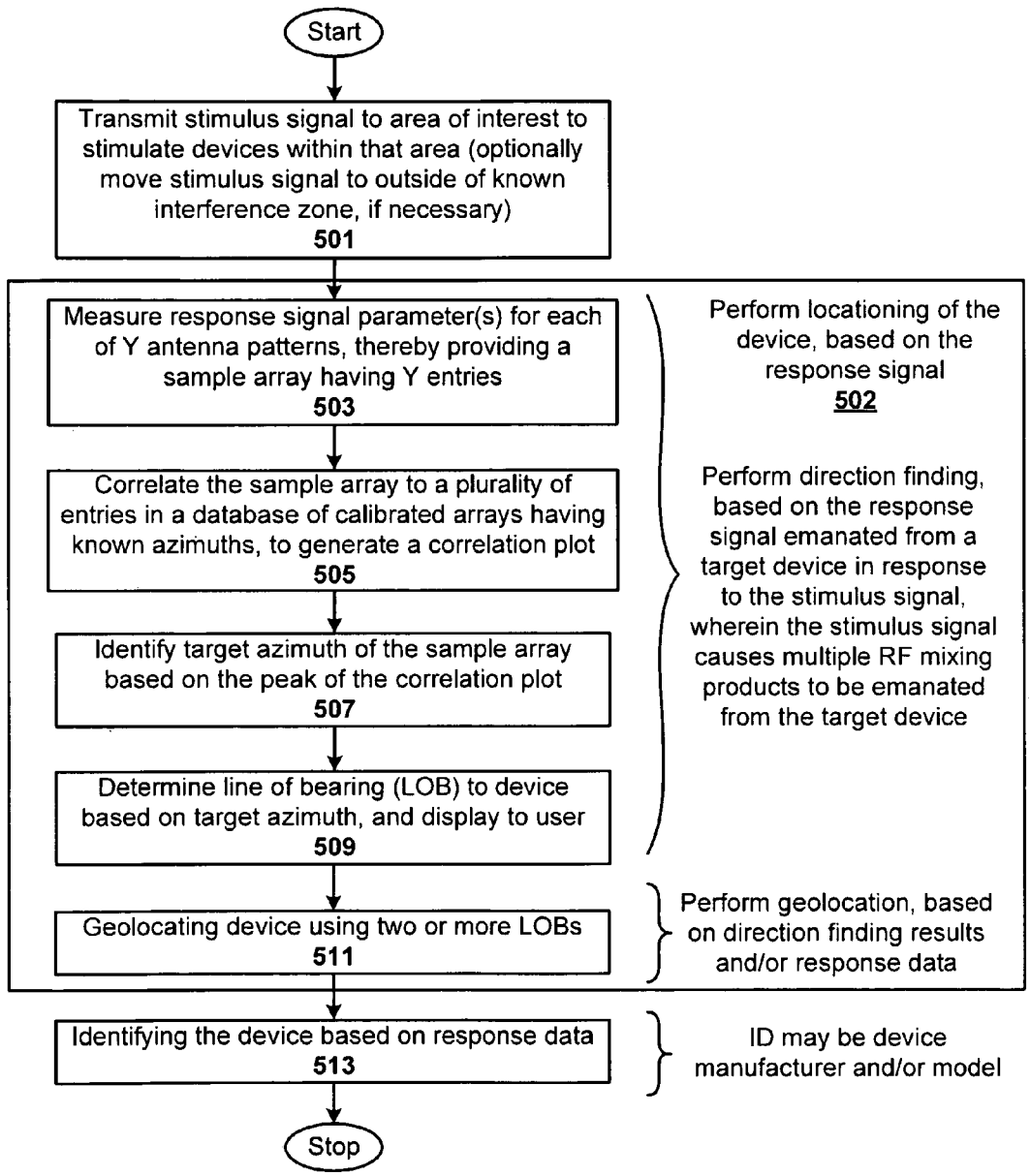
FIG. 5a illustrates a method for determining a line of bearing to a wireless communications device, and geolocating that device, in accordance with an embodiment of the present invention.

FIG. 5a illustrates a method for determining an LOB to a target device 50 and geolocating that device 50 based on multiple LOBs, in accordance with an embodiment of the present invention. As previously explained, the method can be carried out, for example, by system 10.

The method begins with transmitting 501 a stimulus signal to an area of interest to stimulate wireless communications receiver devices within that area. Note that this may optionally include moving the stimulus signal (with respect to its frequency band) to outside of known interference zone, if necessary, as previously described herein. Further, recall that computer 200 of system 10 may be configured to direct transmitter 215 to transmit a specific stimulus signal having parameters customized to a given target device, if so desired (e.g., as commanded by LOB module 207). Alternatively, the stimulus signal can be any signal that causes the target device 50 to provide a response signal that can be detected and processed by system 10 as described herein.

The method generally continues with performing 502 locationing of the target device, which may include direction finding to the target device (based on the response signal emanated from a target device in response to the stimulus signal), and/or performing geolocation of a target device (based on direction finding results and/or the response data). As previously explained, the stimulus signal causes multiple RF mixing products (e.g., upper and lower sideband RF signals) to be emanated from the target device's receiver circuitry stimulated by the stimulus signal. This response is unexpected or otherwise unintentional, as receiver circuitry is generally not designed to transmit information. Conventional direction finding and geolocation techniques can be used to direction find and/or geolocate target devices, based on such response signals. Alternatively, and in the specific example embodiment shown, the direction finding includes steps 503 to 509 and geolocation includes step 511.

In more detail, the method includes measuring 503 the response signal parameter (or parameters) for each of Y antenna patterns, thereby providing a Y sample array of response data. As previously explained, the response signal is the energy emanated from the target device in response to the stimulus signal. In particular, the stimulus signal causes multiple RF mixing products (i.e., upper and lower sideband RF signals) to be emanated from the target device stimulated by the stimulus signal. As previously explained, the multi-element beamforming array 216 is configured with a number of elements that can be selected (e.g., by switching network 218a or otherwise selected) to provide various antenna configurations. In one example case, the antenna has six horizontally-polarized elements, thereby providing $2^6$ different configurations (i.e., Y=64). In another example case, the antenna has six horizontally-polarized and vertically-polarized elements, thereby providing 212 different configurations (i.e., Y=4096).

Figure 5B:
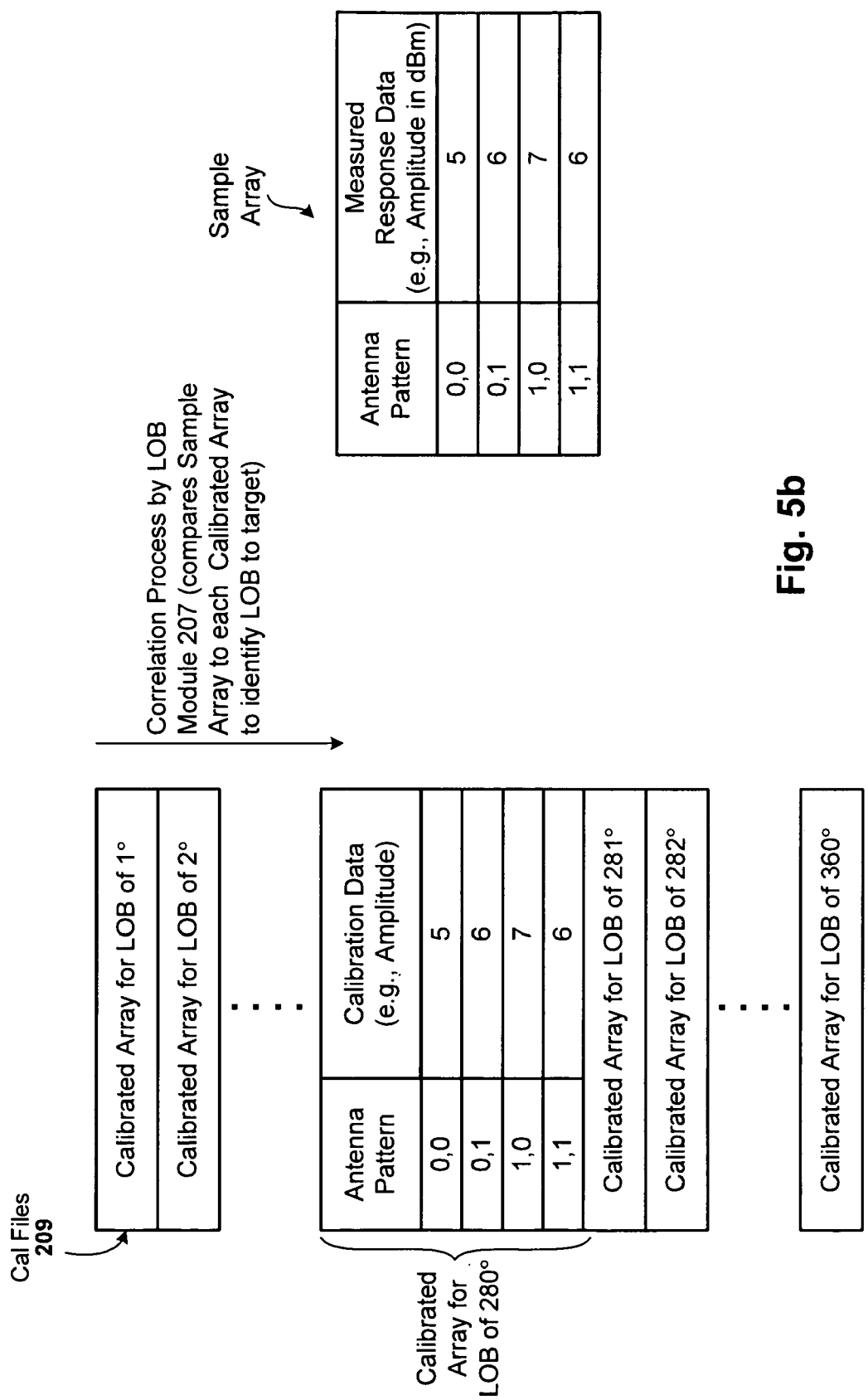
FIG. 5b illustrates a correlation process carried out by the method of FIG. 5a, to identify which calibrated array best matches a sample array, in accordance with an embodiment of the present invention.
Figure 5C:
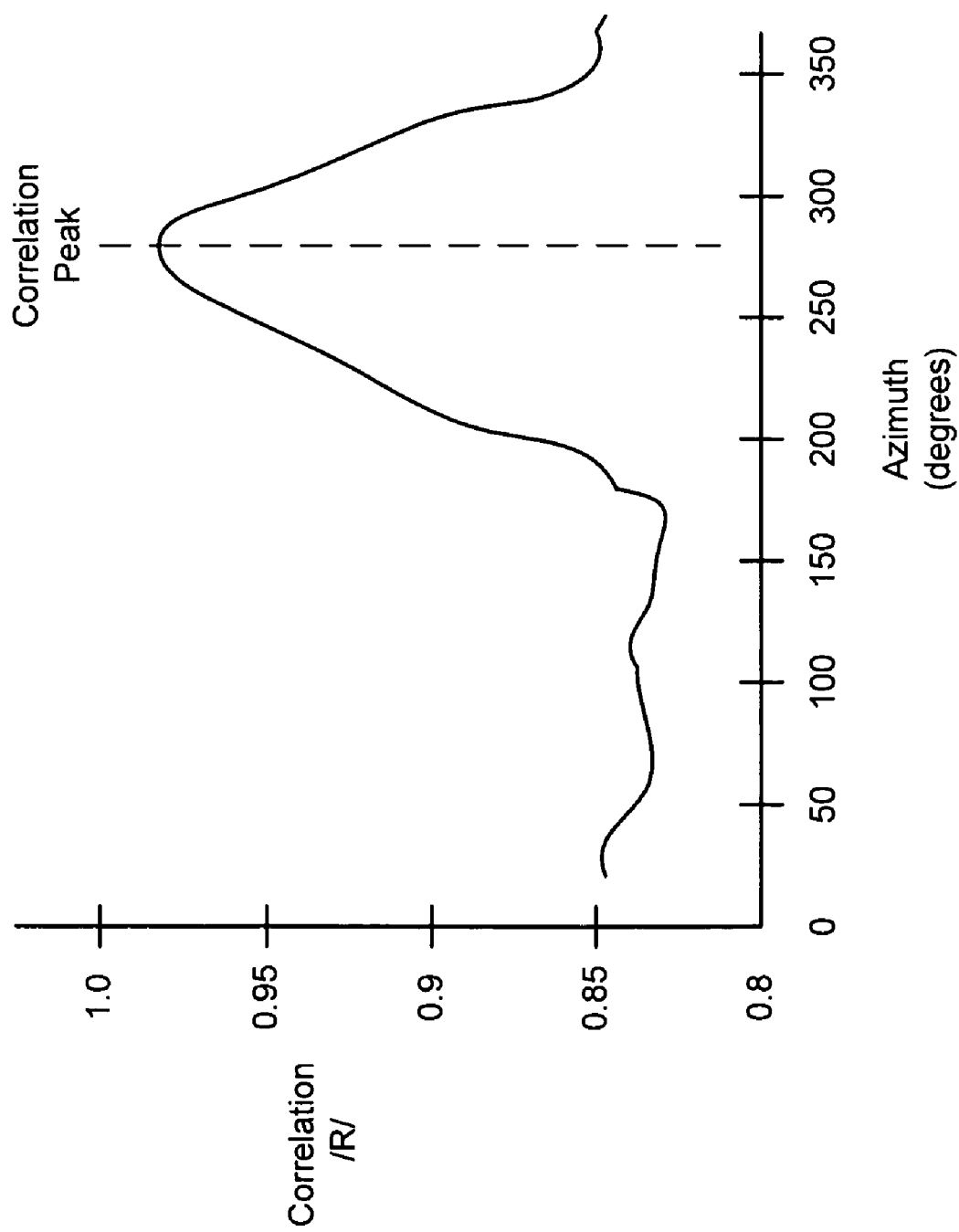
FIG. 5c illustrates a correlation scan or plot of correlation coefficients resulting from the correlation process shown in FIG. 5b, and having a peak that corresponds to an azimuth (or LOB) to the target, in accordance with an embodiment of the present invention.

The method continues with correlating 505 the sample array to a plurality of entries in a database of calibrated arrays having known azimuths, to generate a correlation plot. This process can be carried out, for example, by the LOB module 207, or a dedicated correlation module. As is generally known, a correlation process measures how well two populations match one another. Any conventional correlation technique can be used to perform this correlation, where such techniques typically provide a correlation factor between 0 (low correlation) and 1 (high correlation). FIG. 5b illustrates a correlation process to identify which calibrated array best matches a sample array, in accordance with an embodiment of the present invention. As can be seen, the cal files 209 include 360 calibrated arrays, one for each LOB ranging from 1° to 360° (with a 1° resolution). In this example of FIG. 5b, the antenna array has two elements capable of providing four distinct antenna patterns (indicated as 0,0; 0,1; 1,0; and 1,1). Thus, once the sample array of response data is provided by the array 216 to the computer 200, that sample array can be compared against the cal files 209 to generate a correlation factor for each comparison. Each of these correlation factors can then be plotted to provide a correlation scan or plot as shown in FIG. 5c. The peak of the correlation plot corresponds to an azimuth (or LOB) to the target emitter. Note that LOB is effectively interchangeable with azimuth in this context.

The method therefore continues with identifying 507 the target azimuth of the sample array based on the peak of the correlation plot, and determining a line of bearing (LOB) to target based on the target azimuth. In the example of FIGS. 5b and 5c, the sample array best matches the cal file 209 corresponding to the LOB of 280°. As will be appreciated, the number of azimuths and antenna patterns used for this example was selected for ease of depiction. Other embodiments may have any number of azimuths (represented in cal file 209) and/or antenna patterns. In any such case, the target LOB can be graphically displayed to the user (e.g., as shown in FIG. 4).

The method continues with geolocating 509 the target device based on two or more LOBs, from multiple vantage points. In one such embodiment, this geolocation is carried out by the user moving to a second location and then repeating steps 501 through 507 to get a second LOB to target. The user may repeat at any number of additional locations, providing an LOB at each location. The user may collect such LOBs at multiple points, for instance, along an L-shaped path, or other path that will allow for geolocation based on LOBs to be carried out. The computed LOBs can be stored, for example, in a memory of computer 200, and/or displayed to the user as shown in FIG. 4 (along with travel path). Alternatively, the user can manually plot the LOBs. In any such cases, the LOBs will generally intersect. The more LOBs provided to the target, the more robust and accurate the intersection will be. The user can then translate this intersection to a geographic location, using conventional geolocation techniques. As previously explained, each LOB may be associated with position and heading data (from navigation system), which can also be used to readily and accurately geolocate the target device.

As previously explained, other embodiments of the present invention may employ conventional direction finding and/or geolocation techniques, based on the response signal emanated from the target device in response to the stimulus signal. In another specific embodiment, the direction finding and/or geolocation are implemented as described in the previously incorporated U.S. Pat. Nos. 7,233,285 and 7,358,891. Thus, any suitable direction finding and/or geolocation techniques can be used (in place of steps 503 through 511).

The method may also include identifying 513 the target device based on the response data. This may include, for example, identifying the device manufacturer and/or model, or other pertinent data about the target device that can then be used accordingly, depending on the application at hand.

Detecting Devices with Power-Off

Figure 6A:
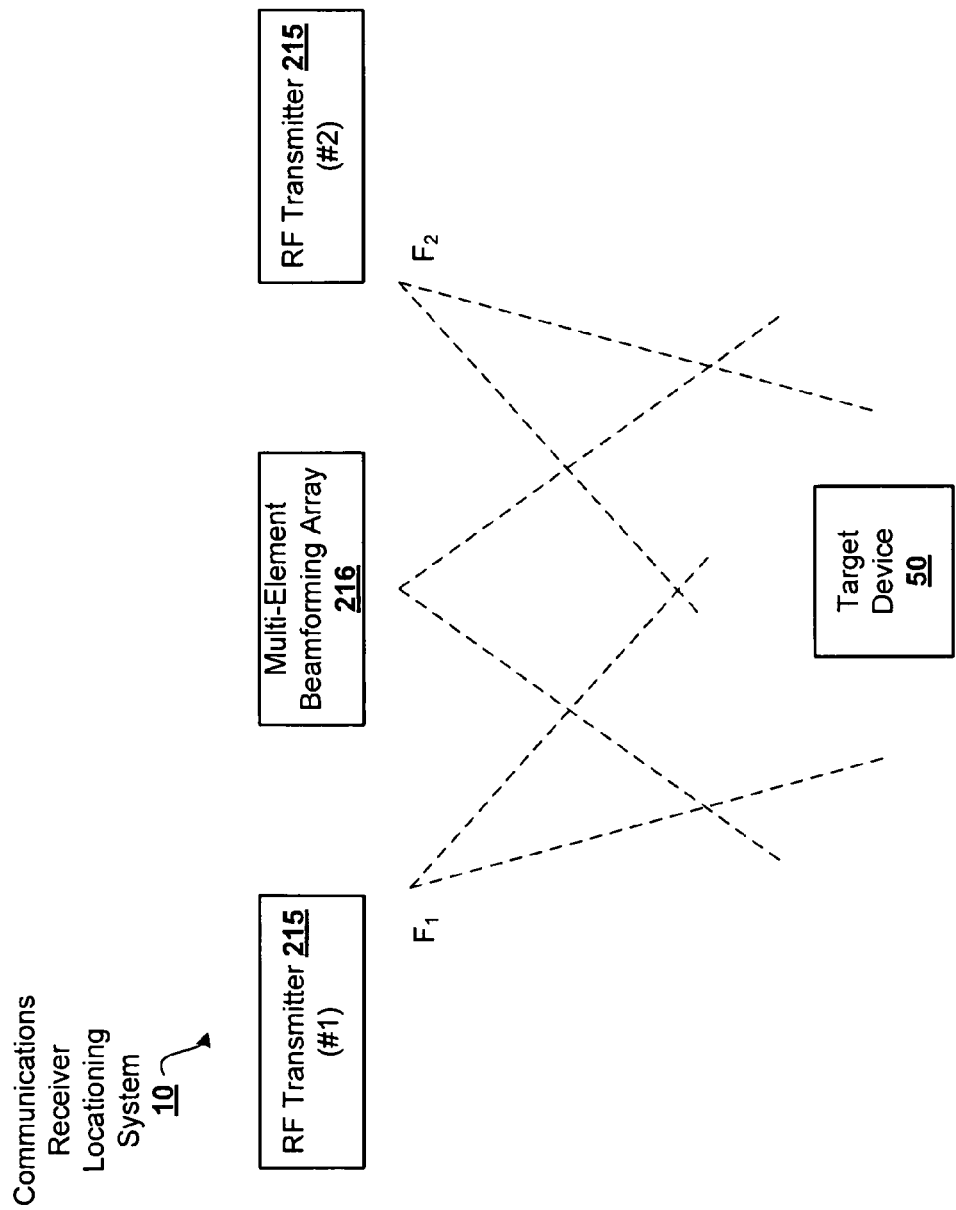
FIGS. 6a and 6b illustrate how the communications receiver detector and locationing system 10 can be used to detect communication devices that are powered-off, in accordance with an embodiment of the present invention.
Figure 6B:
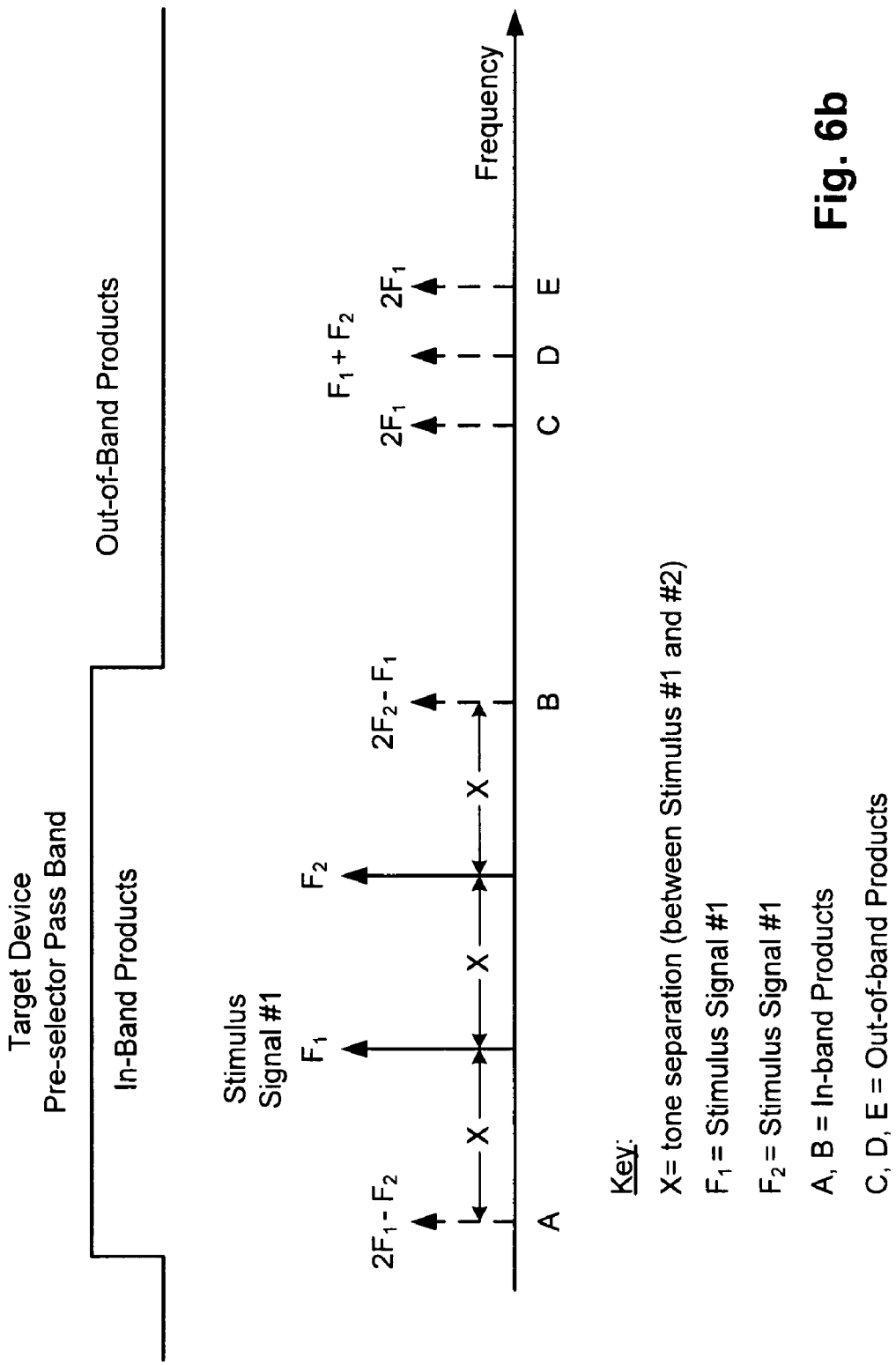

FIGS. 6a and 6b illustrate how the electronics detector and locationing system 10 can be used to detect communication devices that are powered-off, in accordance with an embodiment of the present invention. Unexpectedly, amplitude of the mixing product signals emanated when the target device 50 is powered-on are only slightly higher than the amplitude of the corresponding mixing product signals emanated when the target device is powered-off.

As can be seen, in this particular embodiment, system 10 includes two RF transmitters 215 (and two transmitting antennas 215a). Transmitter #1 transmit stimulus signal $F_1$ and transmitter #2 transmits $F_2$. In addition, each of the transmitters 215 can be positioned, for example, in their respective beam pattern nulls (to avoid interference with one another). A multi-element beamforming array 216 receives responses from the powered-down communication receiver device 50, which is effectively stimulated by the stimulus signals $F_1$ and $F_2$. As will be apparent in light of this disclosure, each of the transmitters 215 and the array 216 can be implemented, along with other functionality and components of system 10, as previously described with reference to FIGS. 1 through 5c. In such embodiments, computer 200 is programmed or otherwise configured to command two stimulus signals.

When device 50 is powered-off, two stimulus signals $F_1$ and $F_2$ (waveforms or tones) are transmitted to the FOV simultaneously. With such dual transmitters, there may be RF harmonic overlap between the two waveforms $F_1$ and $F_2$, caused by harmonics or sideband products on the transmitters. Thus, one technique employed is to separate the frequencies as much as possible (generally designated as tone separation in FIG. 6b). The tone separation is the frequency separation of the two transmitted stimulus waveforms $F_1$ and $F_2$. To identify an appropriate tone separation, multiple tone separation values can be employed, where the tone separation is decreased to the point just before harmonic overlap occurs. For instance, in one example case the tone separation can be set initially to 10 MHz, and then reduced to 1 MHz, 100 kHz, and 10 kHz, sequentially, while scanning for harmonic overlap. The tone separation value can then be set accordingly. A default value that typically works in a given application can also be used.

In any case, and with further reference to FIG. 6b, the dual stimulus waveforms can effectively stimulate the powered-down device 50, such that the device 50 emanates various RF mixing products, that may include in-band or out-of-band mixing products, or both. As previously explained with reference to FIG. 3a, in-band response signals, including mixing products A ($2F_1-F_2$) and B ($2F_2-F_1$) in the example case shown in FIG. 6b, may be susceptible to interference. However, the stimulus signals $F_1$ and $F_2$, despite being within the interference band, may also cause device 50 to emanate out-of-band mixing products C ($2F_1$), D ($F_1+F_2$), and E ($2F_2$). Alternatively, the stimulus signals $F_1$ and $F_2$ can be set outside the interference band, to cause device 50 to emanate out-of-band mixing products C ($2F_1$), D ($F_1+F_2$), and E ($2F_2$).

For example, in the context of an in-band scenario, assume that $F_1$ equals 227 MHz and $F_2$ equals 231 MHz (i.e., tone separation equals 4 MHz in this example case). Mixing product A is 223 MHz ($2F_1-F_2$), and mixing product B is 235 MHz ($2F_2-F_1$). In the context of an out-of-band scenario, assume that $F_1$ equals 462.000 MHz and $F_2$ equals 462.001 MHz (i.e., tone separation equals 1 kHz in this example case). Mixing product C is 924 MHz ($2F_1$), mixing product D is 924.001 MHz ($F_1+F_2$), and mixing product E is 924.002 MHz ($2F_2$).

Once the mixing products are identified and indicate the presence of a target device, locationing techniques can be implemented, for example, to direction find and/or geolocate the device 50. In some instances, one of the mixing product responses is used to compute direction finding and geolocations. In other embodiments, a blend of the mixing product responses (effectively, a composite signal) can be used to compute direction finding and geolocations. Any number of computing schemes will be apparent in light of this disclosure.

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. A method for locating a wireless communications receiver device, the method comprising:
   transmitting a stimulus signal to an area of interest to stimulate wireless communications receiver devices within that area;
   receiving a response signal from a wireless communications receiver device, wherein the stimulus signal causes multiple RF mixing products to be emanated from the wireless communications receiver device; and
   performing locationing of the wireless communications receiver device, based on the response signal.

2. The method of claim 1 wherein performing locationing comprises at least one of:
   performing direction finding to the wireless communications receiver device, based on the response signal; and
   performing geolocation of the wireless communications receiver device, based on at least one of direction finding results or the response data.

3. The method of claim 2 wherein performing direction finding comprises:
   measuring one or more response signal parameters for each of Y antenna patterns, thereby providing a Y sample array of response data from the wireless communications receiver device, wherein Y is greater than 1; and
   correlating the sample array to a plurality of entries in a database of calibrated arrays having known azimuths, to determine a line of bearing (LOB) to the wireless communications receiver device.

4. The method of claim 3 further comprising:
   repeating the transmitting, measuring and correlating to determine one or more additional LOBs to the wireless communications receiver device, each LOB computed from a different geographic location; and
   geolocating the wireless communications receiver device based on the LOBs.

5. The method of claim 3 wherein the correlating step comprises:
   generating a correlation plot having a peak using correlation factors resulting from correlation of the sample array to the plurality of entries in the database;
   identifying a target azimuth of the sample array based on the peak of the correlation plot; and
   determining the LOB to the wireless communications receiver device based on the target azimuth.

6. The method of claim 3 wherein each of the LOBs is associated with position and heading tags provided by a global positioning satellite (GPS) module to assist in geolocating the wireless communications receiver device.

7. The method of claim 1 further comprising:
graphically displaying a line of bearing (LOB) and/or a geolocation to the wireless communications receiver device.

8. The method of claim 1 wherein the stimulus signal has a minimum power level of 0.5 Volts/meter.

9. The method of claim 1 wherein the wireless communications receiver device normally operates in a frequency range, and the stimulus signal has a frequency that is outside the frequency range.

10. The method of claim 1 wherein the one or more response signal parameters include response signal amplitude.

11. The method of claim 1 wherein the method is carried out using a vehicle-based system.

12. The method of claim 1 wherein the stimulus signal has a frequency $F_1$ and the wireless communications receiver device is powered-off, the method further comprising:
transmitting a second stimulus signal having a frequency $F_2$, simultaneously with $F_1$, to the area of interest to stimulate wireless communications receiver devices within that area.

13. The method of claim 12 wherein the response signals include at least one of $2F_1-F_2$, $2F_2-F_1$, $2F_1$, $F_1+F_2$, and/or $2F_2$.

14. A system for locationing a wireless communications receiver device, the system comprising:
a transmitter for transmitting a stimulus signal to an area of interest to stimulate wireless communications receiver devices within that area;
a receiver for receiving a response signal from a wireless communications receiver device, wherein the stimulus signal causes multiple RF mixing products to be emanated from the wireless communications receiver device; and
a processor for performing locationing of the wireless communications receiver device, based on the response signal.

15. The system of claim 14 wherein the processor is configured for performing at least one of:
direction finding to the wireless communications receiver device, based on the response signal; and
geolocation of the wireless communications receiver device, based on at least one of direction finding results or the response data.

16. The system of claim 14 wherein the stimulus signal has a minimum power level of 0.5 Volts/meter.

17. The system of claim 14 wherein the wireless communications receiver device normally operates in a frequency range, and the stimulus signal has a frequency that is outside the frequency range.

18. The system of claim 14 wherein the stimulus signal has a frequency $F_1$ and the wireless communications receiver device is powered-off, the system further comprising:
a second transmitter for transmitting a second stimulus signal having a frequency $F_2$, simultaneously with $F_1$, to the area of interest to stimulate wireless communications receiver devices within that area;
wherein the response signals include signals at one or more of the following frequencies: 2F1–F2, 2F2-F1, 2F1, F1+F2, and/or 2F2.

19. A system for locationing a wireless communications receiver device, the system comprising:
a transmitter for transmitting a stimulus signal to an area of interest to stimulate wireless communications receiver devices within that area, wherein the stimulus signal has a minimum power level of 0.5 Volts/meter;
a receiver for receiving a response signal from a wireless communications receiver device, wherein the stimulus signal causes multiple RF mixing products to be emanated from the wireless communications receiver device; and
a processor for performing locationing of the wireless communications receiver device, based on the response signal, wherein the processor is configured for performing at least one of direction finding to the wireless communications receiver device based on the response signal, and geolocation of the wireless communications receiver device based on at least one of direction finding results or the response data.

20. The system of claim 19 wherein the stimulus signal has a frequency $F_1$ and the wireless communications receiver device is powered-off, the system further comprising:
a second transmitter for transmitting a second stimulus signal having a frequency $F_2$, simultaneously with $F_1$, to the area of interest to stimulate wireless communications receiver devices within that area;
wherein the response signals include signals at one or more of the following frequencies: 2F1–F2, 2F2-F1, 2F1, F1+F2, and/or 2F2.

* * * * *